C. B. JENKINS.
Attaching Metal Caps to Glass, Porcelain, &c.

No. 139,961.  
Patented June 17, 1873.

Witnesses:  
A. Benneckendorf.  
O. Sedgwick.

Inventor:  
C. B. Jenkins  
Per  
Munn & Co.  
Attorneys.

UNITED STATES PATENT OFFICE.

CECIL B. JENKINS, OF NEW YORK, N. Y.

IMPROVEMENT IN ATTACHING METAL CAPS TO GLASS, PORCELAIN, &c.

Specification forming part of Letters Patent No. 139,961, dated June 17, 1873; application filed March 29, 1873.

*To all whom it may concern:*

Be it known that I, CECIL B. JENKINS, of the city, county, and State of New York, have invented a new and useful Improvement in Attaching Metal Caps and other Mountings to Glass, Porcelain, &c., of which the following is a specification:

For attaching caps, lamp-tops, covers, &c. to glass and porcelain articles, I propose to employ one or more metal disks, having slots from the center hole, forming elastic projections which impinge the glass or porcelain forcibly, by having the hole made in the disk slightly smaller than the object to which the cap or other article is secured, and hold better than the plaster-fastenings now in use. This kind of fastening is cheaper than the plaster, and it has the advantage of allowing the taking off the cap or other article and putting it on at any time, without any more labor than is required to put on any ordinary loose metal cap.

Figure 1:
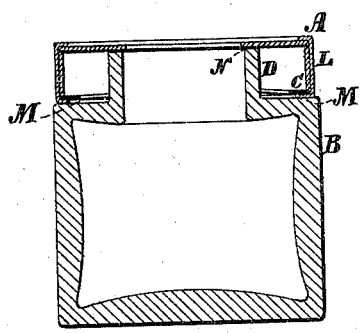
Figure 2:
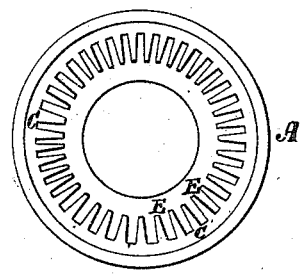
Figure 3:
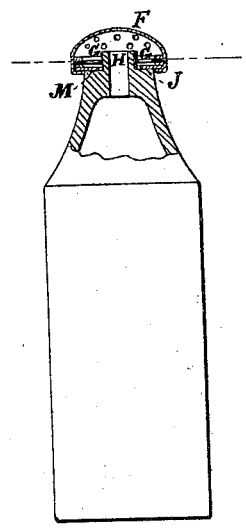
Figure 4:
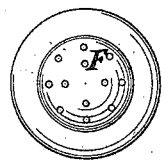
Figure 5:
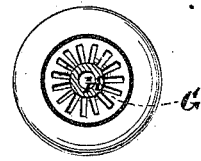

Figure 1 is a sectional elevation of a glass mustard-pot with a metal cap attached by my improved fastening. Fig. 2 is a plan of the under side of the metal cap. Fig. 3 is a sectional elevation of a glass pepper-box with a cap attached as I propose. Fig. 4 is a top view of the cap, and Fig. 5 is a plan of the under side.

A is the metal cap for the glass mustard-pot B, in the bottom of which is a disk or ring C attached in any way, and having a large central hole, not quite so large as the neck D to which it is to be attached, which said ring is slotted with deep notches in the inner edge to form elastic projections E, which impinge tightly against the neck when pressed down as shown in Fig. 1, and hold it fast. F is the pepper-box cap, which has a similarly slotted ring G in its lower part to secure it in the same way to the neck H of the pepper-box. In this case another plain ring or disk J is arranged below the slotted disk, but this is not essential.

The surface of the neck to be impinged by the elastic projections may have grooves or ridges, indentations or projections, or be roughened in any way as a means of causing the projections to bind better than they will on a smooth surface. The hole in the disk may be oval, hexagonal, octagonal, square, or any other shape desired, and the form of the neck to which it is to be attached may or may not conform to the shape of the aperture. One or more of these disks may be used for one attachment. This disk can be stamped out at a single blow in any suitable drop or punching-press, and quickly and cheaply attached to the cap by turning the edge of one over the other, or soldering them together; and besides so fastening them, they may be further strengthened by another ring or band L, Fig. 1. The fastenings will be found very desirable for connecting lamp-tops to the glass portions, and for other purposes.

While I prefer to form the projections by slatting the disks, as above described, I may solder or otherwise form them on or attach them to the disks.

An essential requirement for the success of this fastening for caps and like articles is a shoulder m for the bottom of the cap to rest on, or a broad top N for the top ring to rest on; otherwise, the cap may set awry unless two slotted disks are used, and placed some distance apart.

Having thus described my invention, I claim as new and desire to secure by Letters Patent—

The disk C slotted to form elastic projections E, and applied to the bottom of cap A, and about the neck D, as and for the purpose described.

CECIL B. JENKINS.

Witnesses:
T. B. MOSHER,
ALEX. F. ROBERTS.